US009248859B2

(12) United States Patent
Christ et al.

(10) Patent No.: US 9,248,859 B2
(45) Date of Patent: Feb. 2, 2016

(54) METHOD AND DEVICE FOR ASCERTAINING THE STEERING ANGLE OF A STEERABLE MACHINE

(71) Applicant: BOMAG GmbH, Boppard (DE)

(72) Inventors: Hermann Christ, Bubach (DE); Irina Hagen, Halsenbach (DE); Moritz Nick, Boppard (DE)

(73) Assignee: BOMAG GmbH, Boppard (DE)

( * ) Notice: Subject to any disclaimer, the term of this patent is extended or adjusted under 35 U.S.C. 154(b) by 4 days.

(21) Appl. No.: 14/134,012

(22) Filed: Dec. 19, 2013

(65) Prior Publication Data

US 2014/0188340 A1 Jul. 3, 2014

(30) Foreign Application Priority Data

Dec. 28, 2012 (DE) .......................... 10 2012 025 457
Apr. 8, 2013 (DE) .......................... 10 2013 005 991

(51) Int. Cl.
*A01B 69/00* (2006.01)
*B62D 15/02* (2006.01)

(52) U.S. Cl.
CPC .................................... *B62D 15/024* (2013.01)

(58) Field of Classification Search
CPC ........ B60W 10/20; B62D 5/0463; B62D 6/00
USPC .......................................................... 701/41
See application file for complete search history.

(56) References Cited

U.S. PATENT DOCUMENTS 5,388,658 A * 2/1995 Ando ....................... B62D 6/04
  180/197
6,161,905 A * 12/2000 Hac et al. ....................... 303/146

6,810,317 B2 * 10/2004 Sauter ..................... B60T 8/175
  180/197

(Continued)

FOREIGN PATENT DOCUMENTS

DE          40 08 167 A1    9/1991
DE          100 03 564 A1    8/2001

(Continued)

OTHER PUBLICATIONS

ESPACENET, English Machine Translation of German Application No. DE4008167A1, published on Sep. 19, 1991, retrieved from http://worldwide.espacenet.com on Dec. 19, 2013 (7 pages).
ESPACENET, English Machine Translation of German Application No. DE10003564A1, published on Aug. 2, 2001, retrieved from http://worldwide.espacenet.com on Dec. 19, 2013 (6 pages).

*Primary Examiner* — Behrang Badii
*Assistant Examiner* — Daniel L Greene
(74) *Attorney, Agent, or Firm* — Wood, Herron & Evans, LLP

(57) ABSTRACT

The present invention relates to a device and method for ascertaining the steering angle ($\alpha_3$) of at least one steerable wheel of a set of steerable wheels of a machine that can be directionally controlled, which machine comprises at least said set of steerable wheels and at least one set of drivable wheels showing a specific wheelbase ($a_1$) relative to said steerable wheels and spaced from one another by a specific track width ($b_1$), wherein by means of an ascertained wheel velocity difference of the two driven wheels a yaw rate ($\dot{\psi}$) and a real circle radius ($r_1$) of the driven wheel on the inside of the curve are ascertained. It is then possible to ascertain the steering angle ($\alpha$) from these values by way of the geometrical relationship of wheelbase ($a_1$) and track width ($b_1$) of the machine.

16 Claims, 4 Drawing Sheets

(56) References Cited

U.S. PATENT DOCUMENTS

| | | | |
|---|---|---|---|
| 6,892,123 B2* | 5/2005 | Hac | B60G 17/0195 280/5.518 |
| 7,600,826 B2* | 10/2009 | Lu | B60T 8/172 303/146 |
| 2002/0013651 A1* | 1/2002 | Weiberle et al. | 701/71 |
| 2005/0192729 A1 | 9/2005 | Reinelt et al. | |
| 2013/0179038 A1* | 7/2013 | Goswami et al. | 701/42 |

FOREIGN PATENT DOCUMENTS

| | | |
|---|---|---|
| DE | 10 2004 009 823 A1 | 9/2005 |
| EP | 1 669 716 A1 | 6/2006 |
| EP | 2 022 703 A2 | 2/2009 |

\* cited by examiner

METHOD AND DEVICE FOR ASCERTAINING THE STEERING ANGLE OF A STEERABLE MACHINE

CROSS-REFERENCE TO RELATED APPLICATIONS

The present application claims priority under 35 U.S.C. §119 of German Patent Application Nos. 10 2012 025 457.1, filed Dec. 28, 2012 and 10 2013 005 991.7, filed Apr. 8, 2013, the disclosures of which are hereby incorporated herein by reference in their entireties.

FIELD OF THE INVENTION

The present invention relates to a method and device for ascertaining the steering angle of at least one steerable wheel of a set of steerable wheels of a machine that can be directionally controlled, which machine comprises at least said set of steerable wheels and at least one set of drivable wheels having a specific wheelbase $a_1$ relative to the steerable wheels, and a track width $b_1$ between the drivable wheels.

BACKGROUND OF THE INVENTION

In the prior art, self-propelled machines that can be steered, or directionally controlled, more particularly, construction machines that are driven slowly, are controlled depending on the current steering angle of a set of steerable wheels.

It is known, for instance, to apply remote directional control to such a machine with the aid of appropriate navigational equipment and to transmit steering commands thereto, depending on the position of the machine and the required work route. Such control can only work precisely when the steering angles of the relevant steerable wheels used for directional control are known.

In this context, it is common practice to ascertain the steering angles during operation. Appropriate steering angle sensors can be, for example, potentiometers adapted to send different signals to a control or monitoring unit depending on the steering angle of the respective wheel.

It has been found that such steering angle sensors suffer from the drawback that they have a high tendency to failure. It has further been found that the results given by such steering angle sensors are not always unequivocal to a satisfactory degree.

It is thus an object of the present invention to provide a device and method for determining the steering angle of a steerable wheel of a set of steerable wheels of a machine that can be directionally controlled as described above, that make it possible to ascertain the steering angle of such a machine in a precise, inexpensive, and reliable manner.

SUMMARY OF THE INVENTION

In particular, this object is thus achieved by a method for ascertaining the steering angle $\alpha_3$ of at least one steerable wheel of a set of steerable wheels of a machine that can be directionally controlled, which machine comprises at least said set of steerable wheels and at least one set of drivable wheels, which drivable wheels have a wheelbase $a_1$ relative to the steerable wheels, and a track width $b_1$ disposed therebetween. This method comprises the following method steps:

detecting the wheel velocity of at least two drivable wheels;
ascertaining a wheel velocity difference $\Delta v$ between the velocities $v_1$, $v_2$ of the two wheels;
ascertaining the yaw rate ($\dot\psi$) using the relationship $$\dot\psi = \frac{v_2 - v_1}{b_1}$$

ascertaining the real circle radius $r_1$ of the drivable wheel on the inside of the curve using the relationship $$r_1 = \frac{v_1}{\dot\psi}$$

ascertaining the steering angle $\alpha_3$ using the relationship $$\alpha_3 = \arctan\left(\frac{a_1}{r_1}\right),$$

wherein $v_1$ denotes the velocity of the drivable wheel on the inside of the curve, $v_2$ the velocity of the drivable wheel on the outside of the curve, $\dot\psi$ the yaw rate, $\alpha_3$ the steering angle of the steering wheel on the inside of the curve, $r_1$ the circle radius of the drivable wheel on the inside of the curve, $r_2$ the circle radius of the drivable wheel on the outside of the curve, $a_1$ the wheelbase, and $b_1$ the track width.

This object is further achieved by a method comprising the following method steps:

detecting the velocities ($v_1$, $v_2$), or values that are directly related thereto, which values, unlike the vehicle-specific constants, are ones that are constantly measured, for example, the revolution counts $n_1$, $n_2$ of at least two wheels of the set of drivable wheels;
ascertaining the real circle radius $r_1$ of the drivable wheel on the inside of the curve using the relationship $$r_1 = r_0 - \frac{b_1}{2},$$

$$\text{where } r_0 = -\frac{b_1}{2} \cdot \frac{\left(\frac{v_2}{v_1} + 1\right)}{\left(1 - \frac{v_2}{v_1}\right)}$$

ascertaining the steering angle $\alpha_3$ using the relationship $$\alpha_3 = \arctan\left(\frac{a_1}{r_1}\right),$$

where $v_1$ denotes the velocity of the drivable wheel on the inside of the curve, $v_2$ the velocity of the drivable wheel on the outside of the curve, $\dot\psi$ the yaw rate, $\alpha_3$ the steering angle of the steering wheel on the inside of the curve, $r_1$ the circle radius of the drivable wheel on the inside of the curve, $r_2$ the circle radius of the drivable wheel on the outside of the curve, $a_1$ the wheelbase, and $b_1$ the track width.

This object is further achieved by a device for ascertaining the steering angle $\alpha_3$ of at least one wheel of a set of steerable wheels of a machine that can be directionally controlled, which machine comprises at least said set of steerable wheels and at least one set of drivable wheels, which wheels have a wheelbase $a_1$ relative to the steerable wheels and are separated from one another by a specific track width $b_1$, which device comprises a plurality of wheel velocity sensors for ascertaining the respective wheel velocities $v_1$, $v_2$ and/or values that are directly related thereto, for example, the revolution counts $n_1$, $n_2$ of the drivable wheels, which device also comprises a control device adapted to receive the ascertained wheel velocities, and/or the values directly related thereto, e.g., the revolution counts $n_1$, $n_2$ of the drivable wheels, from which values it ascertains the steering angle $\alpha_3$ of at least one steerable wheel.

For the purposes of the present invention, the term 'wheel velocity sensors' is understood as referring to all sensors capable of being used for the detection of the velocity of a wheel. Hence, it also includes those sensors that are adapted to detect a wheel's revolution count or similar values from which the wheel's velocity can be ascertained.

Unlike the devices and methods of the prior art for ascertaining the steering angle of a machine that can be directionally controlled, no steering angle sensors are used, and more particularly, no such sensors are disposed on the steerable wheels. Rather, ascertainment of the respective steering angle is performed using a dedicated control device, based on machine-specific data and using suitable velocity sensors, revolution count sensors, and other sensors on the drivable wheels.

In this context, it may again be pointed out that instead of detecting the wheel velocity of the individual drivable wheels, it is of course possible to discern the revolution counts thereof, in order then to compute the wheel velocity from the known wheel diameter and the revolution count. It may also be pointed out that in addition to ascertaining the steering angle $\alpha_3$ of a wheel on the inside of the curve, all of the other steering angles of the vehicle can be ascertained by way of its known geometries.

An essential advantage of the claimed method or the claimed device of the present invention is the increase in reliability achieved, since far fewer mechanical items are necessary for ascertaining the steering angle. The method of the present invention allows, furthermore, for direct ascertainment of the real steering angle of the respective steering wheel, in which case, in particular, erroneous detections due to machine-specific inaccuracies are avoided.

In the context of the claimed method or claimed device of the present invention, it is possible to differentiate between a wheel on the inside of a curve and that on the outside thereof, whether a steering or drivable wheel, by way of the detected velocity, that is to say, the revolution count of the wheel. When turning, the velocity of the wheel on the outside of the curve is of course higher than that of the wheel on the inside of the curve. This fact is taken into account when ascertaining the steering angle, so that, for example, when determining the wheel velocity difference $\Delta v$, unequivocal results will always be achievable.

According to one aspect of the present invention, a velocity signal, or a revolution count signal, is ascertained for each wheel using wheel velocity sensors on the drivable wheels. The steering angle $\alpha_3$ can then be ascertained from these two signals coming from the two drivable wheels, either through computation of the yaw rate and the real circle radius $r_1$ of the drivable wheel, or through ascertaining the real circle radius $r_1$ and the mid-point radius $r_0$ of the steering angle $\alpha_3$.

The device of the present invention comprises, furthermore, a control device configured such that it can execute the ascertainment of the required data and can draw conclusions from the vehicle geometries and the detected velocities or revolution counts, etc.

The sensors of the device of the present invention can, for example, be revolution count sensors as known per se, in connection with an electronic control unit, or alternatively, in the case of a hydraulic drive, they can be pressure sensors, used to detect the pressures generated in the respective hydraulic pumps. It is also possible to compute the wheel velocity of the drivable wheels by way of power sensors, or by measuring filling levels in hydraulic control elements.

In the case of machines in which the steering angle of the steerable wheels is directly coupled to the velocity of the drivable wheels in order, for example, to ensure precise turning, the method and device described above are particularly advantage, since the ascertainment of the steering angle can be integrated seamlessly into the coupling process between the velocity of the driving (rear) wheels and the adjustment of the steering angle of the steerable (front) wheels. In this respect, the present invention thus also relates to a machine in which the steering angle is ascertained in the aforementioned manner, or to a machine in which a corresponding device for determining the steering angle is provided, and in which there is direct feedback between the steering angle and the propulsion velocity of the drivable wheels, to ensure driving along an optimal curve, particularly a curve without the occurrence of wheel slip.

In order to ascertain exact steering angles even when a wheel slips, and to avoid measurement inaccuracy of the steering angle due to slipping of at least one drivable wheel, slip detection is preferably carried out. An appropriate slip indicator is used depending on whether or not at least one of the drivable wheels is slipping. When the slip indicator shows positive results, the (previously) found value for the steering angle is preferably retained during steering angle detection. If, in the case of positive slip indication, i.e., if a wheel is slipping, the value for the steering angle is changed in accordance with experienced values, there would be the risk that the change in velocity accompanying a slip of the front wheel might lead to inaccurate ascertainment of a steering angle. Alternatively, it might falsely be interpreted as being an adjustment in the steering angle, or as being an entirely new steering angle.

For slip detection in the above context, it is possible to perform a plausibility check on the detected wheel velocities or the detected revolution count of at least one of the drivable wheels. There are various ways of doing this.

In particular, it is possible, during the plausibility check, to ascertain the progression of the wheel velocity and/or the progression of the rotational speed and/or the progression of values directly related to these values, and to compare these with a progression threshold value, where a positive slip indicator is set when this threshold is underrun or overrun.

The progression threshold value can, for example, be a minimum permitted period $t_{min}$ of all detected changes in wheel velocity over a time period t. A suitable time period is, for example, 0.5 second$\leq t_{min} \leq 2$ seconds, or more particularly, $t_{min}=1$ second. That is to say, a slip has happened or is assumed to have happened when the velocity of at least one wheel, or the wheel velocity difference between the two wheels, changes from a starting value to an end value over a time period $t < t_{min}$, which time period is very short, e.g., less than one second. This is significant when the change in velocity, or the change in the wheel velocity difference, is detected at time t=0 and has finished before the minimum permitted period $t_{min}$ has elapsed and the velocity has assumed a new value. The above also holds, identically, for the revolution count, or a change in revolution count of the wheels.

It is also possible for a progression threshold value to describe a maximum permitted change in wheel velocity and/or rotational speed within the plausibility time period, in particular, a maximum permitted change of from 10% to 30%, and, more particularly, one of 20%. In this case, the progression threshold value is taken as the maximum permitted change in wheel velocity and/or in the wheel velocity difference, and an overrun of the progression threshold value occurs when, for example, the wheel velocity suddenly changes, particularly when it undergoes a change of 10% to 30% within a given time period t, more particularly, when it undergoes a change of 20% in that time period. Here again, the change is to be understood as that occurring over the whole time period from the beginning of the change to its end. The above holds, identically, for the revolution counts of the wheels.

It is further possible to set the threshold progression value such that it applies when a detected change in wheel velocity of one wheel is approximately 0% and a detected change in wheel velocity of the other wheel is greater than 0%. If it is found that one wheel has undergone a change in velocity while the other has undergone no such change, wheel slipping can be inferred. If the threshold progression value is set according to these conditions, the plausibility check can compare the detected wheel velocities, etc., with the configured threshold progression value and set a positive slip indicator as necessary. Here again, changes of the revolution count of the wheels can be detected and assessed accordingly.

A threshold progression value can further be set such that it applies when a detected change in wheel velocity $v_1$ or $v_2$, or a change in revolution count, is approximately zero and a detected change in the other wheel velocity $v_2$ or $v_1$ respectively, or a change of revolution count, is greater than zero. This arrangement also allows for detection of slipping.

Of course, the methods described above for slip detection can be applied singly or in combination with one another.

The control device preferably comprises a slip detecting device to perform slip detection, which is configured such that it carries out the plausibility check based on the detected velocities or revolution counts of the drivable wheels, in order to exclude inaccuracy in the ascertainment of the steering angle due to the presence of slipping of at least one of the drivable wheels.

This slip detecting device makes it possible, in particular, to record the progression of the wheel velocity and/or the progression of the difference in wheel velocities and/or the progression of values directly related to these values, such as, for example, progression in revolution count, progression in time, acceleration or deceleration, driving power, the time period of changes, etc.

BRIEF DESCRIPTION OF THE DRAWINGS

The present invention is described below with reference to an exemplary embodiment illustrated in the drawings, in which.

DETAILED DESCRIPTION OF THE INVENTION

Figure 1:
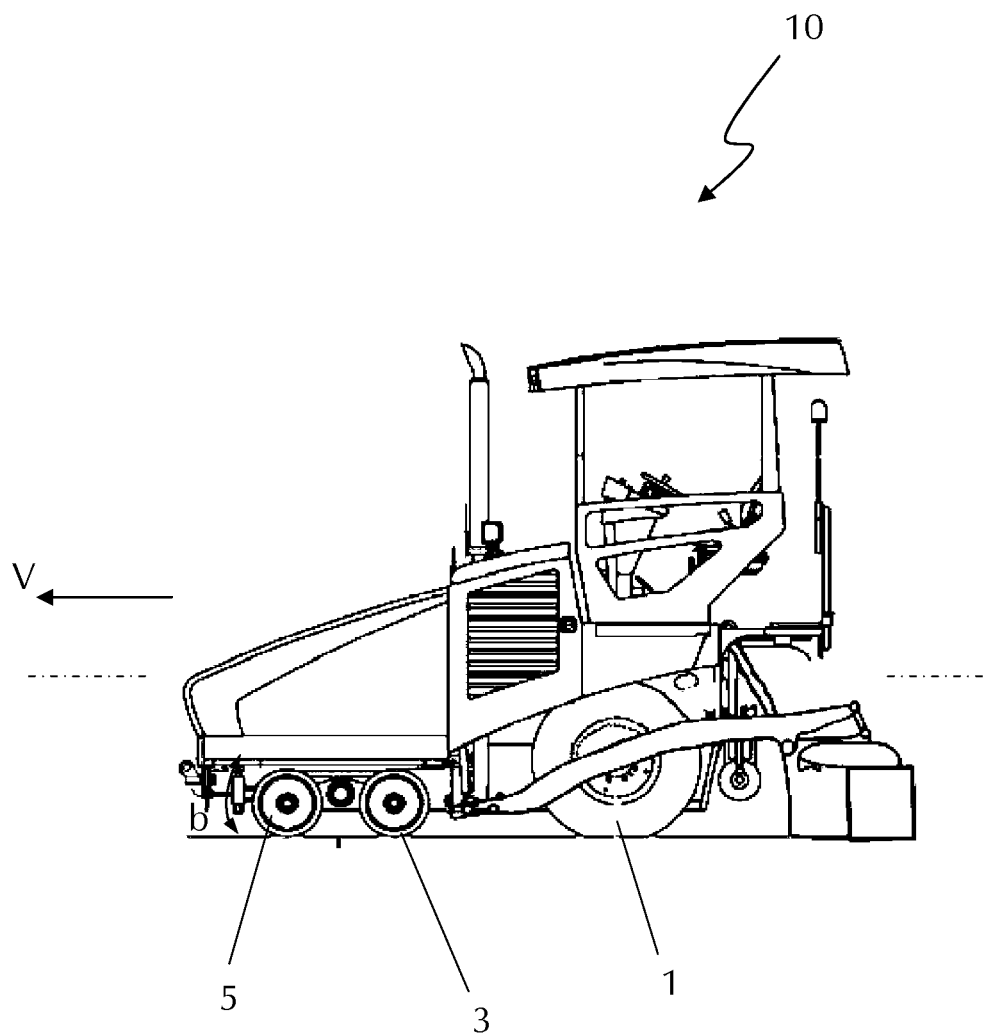
FIG. 1 is a diagrammatic side view of a self-propelled construction machine, in particular, a paving machine.
Figure 2:
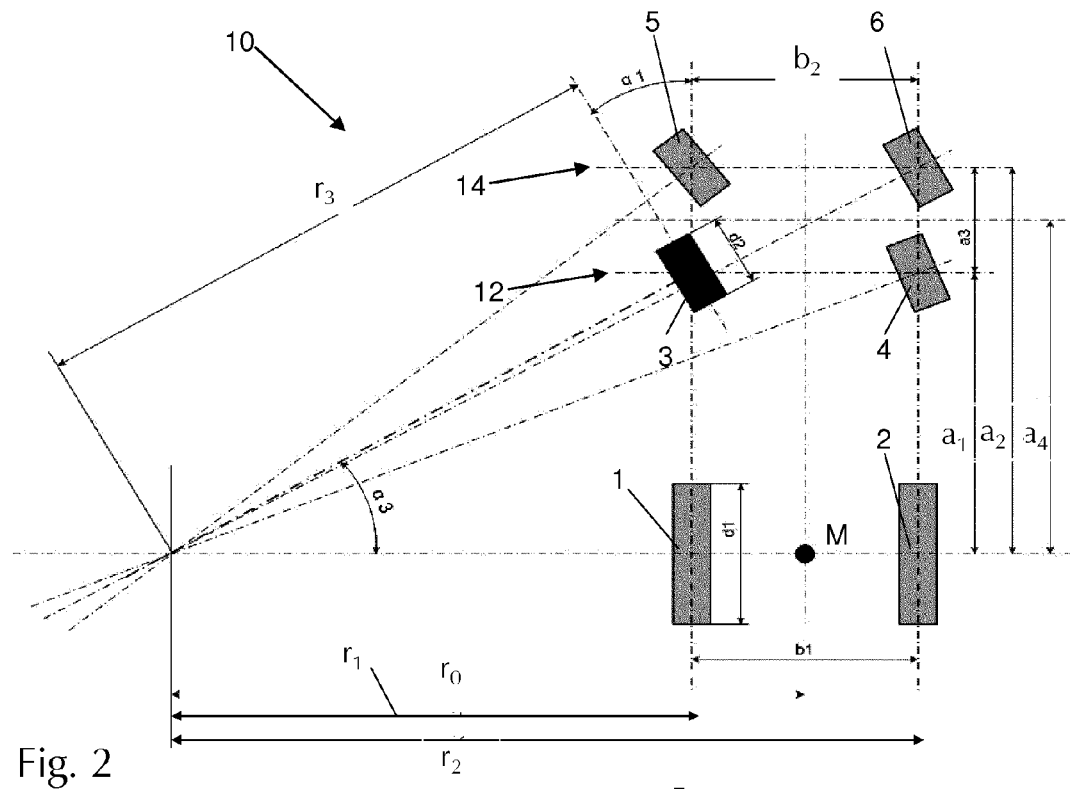
FIG. 2 is a diagrammatic plan view of an embodiment of a machine that can be directionally controlled, including geometric machine data.

A self-propelled construction machine, designed as a road paver 10, comprises, according to FIGS. 1 and 2, a chassis with three pairs of wheels, of which only the left-hand wheels 1, 2, and 5 are visible in FIG. 1. The full complement of wheels is visible in FIG. 2. The wheels 1, 2 of a first wheel pair are designed as drivable wheels. Two further pairs 12, 14 are disposed on a tandem bogie, and are respectively equipped with steerable wheels 3, 4 and 5, 6. This machine thus has a doubly steerable front axle or tandem axle. The forward direction of travel is designated by V.

In the following description, identical or identically functioning parts are designated by the same reference signs, with occasional subscript numerals for disambiguation.

FIG. 2 shows a plan view of the chassis of the paving machine 10 when traveling along a curve, more particularly, when turning to the left.

The drivable wheels 1, 2 are disposed on a common axle, separated from each other by the track width $b_1$. The drivable wheels 1, 2 are furthermore separated from the set 12 of steerable wheels 3, 4 by the wheelbase $a_1$. This machine is geometrically constructed such that the individual wheels 1, 2 are again separated by a wheelbase $a_1$ from the wheels 3 and 4, respectively.

In FIG. 2, all of the steerable wheels 3, 4, 5, 6 are turned, and it is thus visible that each wheel has a distinct Ackermann angle in accordance with its axle-pivot steering system. The Ackermann (or steering) angle of the wheel 3 on the inside of the curve is designated here by the reference sign $\alpha_3$. With forward movement in the direction of the arrow V (FIG. 1) by means of the drivable wheels 1, 2, the machine 10 turns as defined by the radius $r_3$ referring to the wheel 3, due to the steering action of the steerable wheels 3, 4, 5, 6.

Figure 3:
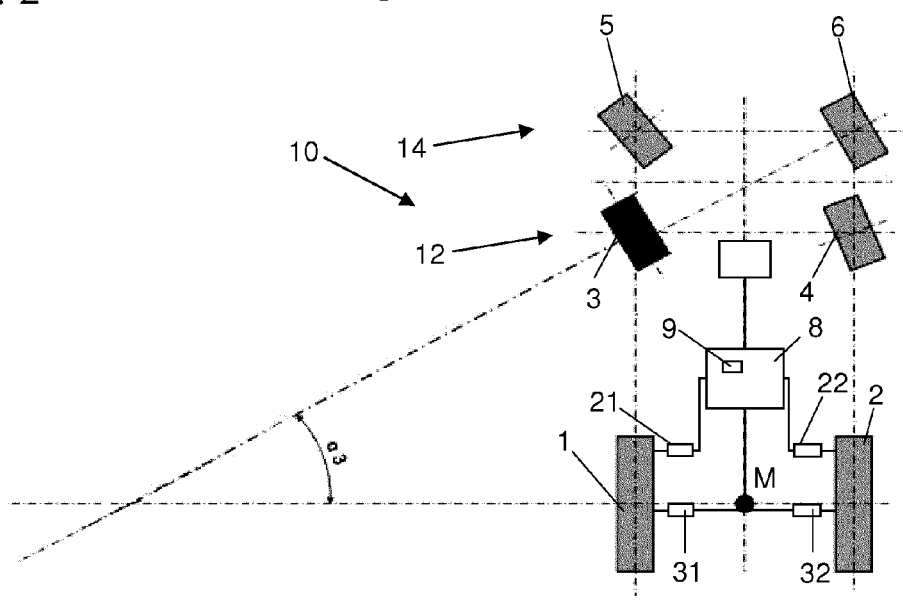
FIG. 3 shows the embodiment illustrated in FIG. 2, including an embodiment of the device of the invention for ascertaining the steering angle of a steerable wheel.

As shown in FIG. 3, the machine 10 has a control device 8, by means of which the driving power of the drivable wheels 1, 2 and the steering action of the steerable wheels 3, 4, 5, 6 can be controlled. Wheel velocity sensors 21, 22 are disposed on the drivable wheels 1, 2 for ascertaining relevant control data, which sensors are adapted to detect the individual wheel velocities $v_1$, $v_2$, or the revolution counts $n_1$, $n_2$, of the drivable wheels 1 and 2, respectively. The driving power itself can come, for example, from hydraulic motors 31, 32, allocated to the individual drivable wheels 1, 2, providing independent driving power for the respective wheels. Direct access to the driving motors 31, 32 by means of the control device 8 is possible.

The control device 8 comprises, inter alia, a slip detecting device 9, by means of which detection of the occurrence of slip of at least one of the drivable wheels 1, 2 is possible, as described in detail below. More particularly, a plausibility check of the detected wheel velocity $v_1$, $v_2$ of the drivable wheels 1, 2 or of values directly related thereto is possible.

Figure 4:
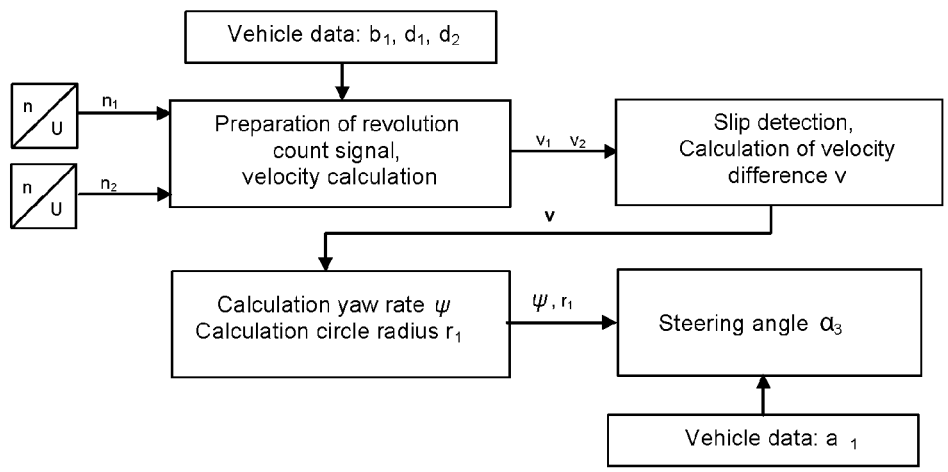
FIG. 4 is a flow chart for carrying out an embodiment of the method of the invention for ascertaining the steering angle of at least one steerable wheel of a machine as illustrated in FIG. 2.

As shown in FIG. 4 in conjunction with FIG. 2 and FIG. 3, ascertaining the steering angle $\alpha_3$ takes place in the following manner:

Vehicle data pertaining to the machine 10 and relevant to ascertainment of the steering angle $\alpha_3$ are stored in the control device 8, or in a device associated therewith. Such data can be, for example, the track width $b_1$, the circumference or radius of the wheels 1, 2 and the wheelbase $a_1$ between the drivable wheels 1 and 2 and the set 12 of steerable wheels 3, 4.

While operating, whether traveling to, or working at, a site, the revolution count or the wheel velocity of the drivable wheels 1, 2 is detected by way of the wheel velocity sensors 21, 22, which sensors are linked to the control device 8. As mentioned above, the wheel velocity sensors may determine the velocity of the drivable wheels 1, 2 directly, or they may ascertain the wheel revolution count, that is, its rotation velocity, from which the wheel velocity can be computed. FIG. 4 demonstrates such a procedure.

The velocity $v_1$, $v_2$ of the two drivable wheels 1, 2 is here ascertained by way of the wheel turning velocity $n_1$, $n_2$ as ascertained through the wheel velocity sensors 21, 22 and the known circumference U of the wheels 1, 2, in combination with the vehicle data stored in the control device 8.

By means of this velocity, the yaw rate $\psi$ can be ascertained, as can the circle radius $r_1$ of the wheel on the inside of the curve, and the circle radius $r_0$ of the mid-point of the distance between the inner wheel and the outer wheel.

Taking into account the radius $r_1$ of the wheel 1 on the inside of the curve, the following relationships hold:

$$v_1 = r_1 \psi$$
$$v_2 = (r_1 + b_1)\psi$$
$$\psi = \frac{v_2 - v_1}{b_1}$$
$$\rightarrow r_1 = \frac{v_1}{\psi}$$
$$\alpha_3 = \arctan\left(\frac{a_1}{r_1}\right)$$

To calculate the circle radius $r_0$ of the middle of the vehicle, along which circle the mid-point of the distance between the inner wheel and the outer wheel moves, the following relationships should be used:

$$\frac{r_1}{r_2} = \frac{n_2}{n_1}$$
$$\frac{r_0 + \frac{b_1}{2}}{r_0 - \frac{b_1}{2}} = \frac{n_2}{n_1}$$
$$r_0 = -\frac{b_1}{2} \cdot \frac{\left(\frac{n_2}{n_1} + 1\right)}{\left(1 - \frac{n_2}{n_1}\right)} = \frac{a_1}{\tan\alpha_3}$$
$$\alpha_3 = \arctan\left(-\frac{2a_1}{b_1} \cdot \frac{\left(1 - \frac{n_2}{n_1}\right)}{\left(\frac{n_2}{n_1} + 1\right)}\right)$$

where:
$v_1$ denotes the velocity of the drivable wheel on the inside of the curve;
$v_2$ denotes the velocity of the drivable wheel on the outside of the curve;
$n_1$ denotes the revolution count of the drivable wheel on the inside of the curve;
$n_2$ denotes the revolution count of the drivable wheel on the outside of the curve;
$\psi$ denotes the yaw rate;
$\alpha_3$ denotes the steering angle of the steerable wheel on the inside of the curve;
$r_1$ denotes the circle radius of the drivable wheel on the inside of the curve;
$r_2$ denotes the circle radius of the drivable wheel on the outside of the curve;
$a_1$ denotes the wheelbase;
$b_1$ denotes the track width.

As shown in FIG. 2, the ascertained circle radius $r_1$ of the drivable wheel 1 on the inside of the curve is directly related to the steering angle $\alpha_3$ and the wheelbase $a_1$, such that the steering angle $\alpha_3$ can be ascertained as follows:

$$\alpha_3 = \arctan\left(\frac{a_1}{r_1}\right)$$

As an alternative to this approach, the steering angle $\alpha_3$ can be ascertained using the geometrical relationships between the inner and outer circle radii $r_1$, $r_2$ of the inner and outer drivable wheels $r_1$, $r_2$. In such a case, the steering angle $\alpha_3$ is obtained from the following equations:

$$\frac{r_1}{r_2} = \frac{v_2}{v_1}$$
$$\frac{r_0 + \frac{b_1}{2}}{r_0 - \frac{b_1}{2}} = \frac{n_2}{n_1}$$
$$r_0 = -\frac{b_1}{2} \cdot \frac{\left(\frac{n_2}{n_1} + 1\right)}{\left(1 - \frac{n_2}{n_1}\right)};$$
$$r_1 = r_0 - \frac{b_1}{2}$$

where:
$v_1$ denotes the velocity of the drivable wheel on the inside of the curve;
$v_2$ denotes the velocity of the drivable wheel on the outside of the curve;
$n_1$ denotes the revolution count of the drivable wheel on the inside of the curve;
$n_2$ denotes the revolution count of the drivable wheel on the outside of the curve;
$\psi$ denotes the yaw rate;
$\alpha_3$ denotes the steering angle of the steerable wheel 3 on the inside of the curve;
$r_1$ denotes the circle radius of the drivable wheel 1 on the inside of the curve;
$r_2$ denotes the circle radius of the drivable wheel 2 on the outside of the curve;
$a_1$ denotes the wheelbase;
$b_1$ denotes the track width.

The steering angle $\alpha_3$ is again determined as follows:

$$\alpha_3 = \arctan\left(\frac{a_1}{r_1}\right)$$

Provided that neither of the drivable wheels 1, 2 is slipping, the exact steering angle $\alpha_3$ of the machine 10 will be obtained in a very simple manner.

Figure 5:
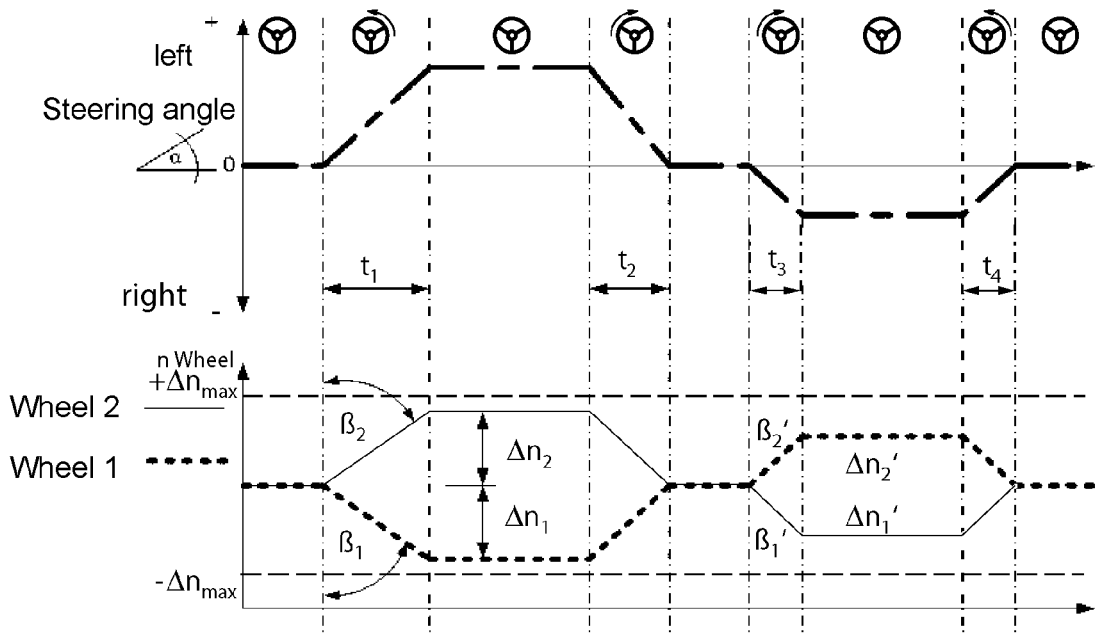
FIG. 5 is a steering schema demonstrating a steering operation of the exemplary embodiment illustrated in FIG. 2.

The effect of the steering operation on the velocity $v_1$, $v_2$ of the drivable wheels 1, 2, or respectively, on the revolution count $n_1$ of wheel 1, and the revolution count $n_2$ of wheel 2, is demonstrated in FIG. 5.

While the machine is moving directly forward, that is, when there is no steering input a acting on the steerable wheels 3, 4, 5, 6, the drivable wheels 1, 2 move synchronously. The revolution count $n_1$, $n_2$ of the two wheels is identical. As soon as steering input from a suitable regulating device starts, the revolution counts $n_1$, $n_2$ of the two wheels 1, 2 change in a geometrically dependent fashion, in which case the wheel 1 on the inside of the curve undergoes a reduction in revolution count $-\Delta n_1$, and the wheel 2 on the outside of the curve undergoes an increase in revolution count $+\Delta n_2$. The same holds for the respective changes in velocity $\Delta v$.

In the example shown, there is initially steering input to the left, which lasts for a first steering period $t_1$. This steering period $t_1$ is governed by the steering angle $\alpha$. The larger the steering angle $\alpha$, the shorter the steering period $t_1$. During the steering operation, the wheel 1 on the inside of the curve rotates with a revolution count $n_1$, which is lower than the revolution count $n_2$ of the wheel 2 on the outside of the curve. In the example shown, the revolution count $n_1$ of the wheel 1 on the inside of the curve for steering period $t_1$ decreases with increasing steering angle $\alpha$, while the revolution count $n_2$ of the wheel 2 on the outside of the curve increases by the same amount. At the end of a steering period $t_1$ the absolute value of the reduction in revolution count $-\Delta n_1$ of the wheel 1 on the inside of the curve is equal to that of the increase in revolution count $+\Delta n_2$ of the wheel 2 on the outside of the curve. The gradient $\beta_1$ shown in FIG. 5, of the progression of the revolution count of the wheel 1 on the inside of the curve thus corresponds, with opposite sign, to the gradient $\beta_2$ of the progression of the revolution count of the wheel 2 on the outside of the curve.

This operation is repeated with inverted signs when there is steering input for a negative steering angle $-\alpha$ for a further steering period $t_2$ in the opposite direction, that is to say, to the right.

In FIG. 5, two further steering operations are shown by way of example, these being carried out for a third steering period $t_3$ and a fourth steering period $t_4$, which are shorter than the first and second steering periods $t_1$ and $t_2$, so that there result a smaller increase in revolution count $+\Delta n_1'$ and a smaller decrease in revolution count $+\Delta n_2'$.

If the changes in revolution count $\Delta n_1$, $\Delta n_1'$ of the wheel 1 on the inside of the curve and the changes in revolution count $\Delta n_2$, $\Delta n_2'$ of the wheel 2 on the outside of the curve are of equal magnitude for a given steering input, the associated steering angle $\alpha$ can be derived therefrom, and consequently the steering input for the steerable wheels 3, 4, 5, 6 can be inferred.

Furthermore, it is possible to ascertain, by way of the revolution counts $n_1$ and $n_2$ or $n_3$ and $n_4$ of the two wheels 1, 2, respectively, and their respective revolution count changes $\Delta n_1$, $\Delta n_2$ or $\Delta n_1'$, $\Delta n_2'$, whether one of the two wheels 1, 2 is slipping. If, as in the example illustrated in FIG. 5, the revolution count changes $\Delta n_1$, $\Delta n_2$ or $\Delta n_1'$, $\Delta n_2'$, of the two wheels 1, 2 are equal in magnitude within each pair, no slip is occurring. If, with the same steering angle $\alpha$, their magnitudes differ within the pair, slipping is taking place.

In the same way, the gradients $\beta_1$, $\beta_2$, $\beta_1'$, $\beta_2'$ of the revolution count progressions of the wheel 1 on the inside of the curve and those of the wheel 2 on the outside of the curve, can make it possible to determine whether there is slipping between the two wheels 1, 2. If, according to FIG. 5, the gradients $\beta_1$, $\beta_2$ or $\beta_1'$, $\beta_2'$ are equal in magnitude for each pair, no slipping is taking place. A deviation of the gradients $\beta_1$, $\beta_2$ or $\beta_1'$, $\beta_2'$ from each other indicates that slipping is occurring.

For practical applications it is appropriate to designate a maximum permitted change in revolution count $\pm\Delta n_{max}$ for a steering operation, which is valid for both wheels 1, 2 and which is typical of a steering operation. In the examples illustrated in FIG. 5 this maximum permitted change in revolution count is not exceeded for any steering operation. If this maximum change in revolution count $\pm\Delta n_{max}$ is exceeded, this signifies that the relevant wheels 1, 2 are spinning. A typical example according to FIG. 5 is a maximum permitted change in revolution count of $\pm\Delta n_{max}$ of 20%.

The maximum permitted change in revolution count $\pm\Delta n_{max}$ represents a maximum gradient. All of the gradients $\beta_1$, $\beta_2$ or $\beta_1'$, $\beta_2'$ of the exemplary embodiment illustrated in FIG. 5 are accordingly below the maximum gradient.

Figure 6:
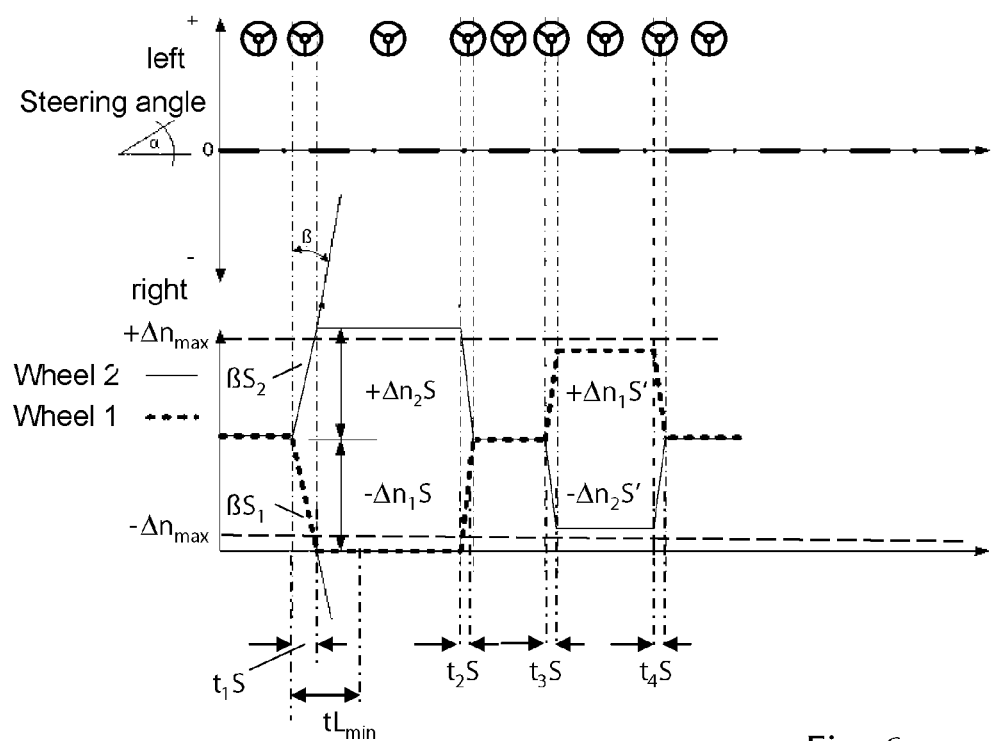
FIG. 6 is a steering schema for an exemplary embodiment illustrated in FIG. 2 on the occurrence of slip.

FIG. 6 is a diagrammatical representation of the state when the machine 10 is moving forwards, in a situation where there is slipping of the drivable wheels 1, 2. Despite the fact that the machine 10 is moving directly forwards, and the steering angle $\alpha$ is thus 0°, the wheel velocity sensors 21, 22 (FIG. 3) on the wheels 1, 2 will detect, in a relatively short first time period $t_1S$, a wheel velocity change or a first reduction in revolution count $-\Delta n_1S$ of the wheel 1 on the inside of the curve and an increase in revolution count $+\Delta n_2S$ of the wheel 2 on the outside of the curve. The increase in revolution count $+\Delta n_2S$ and the reduction in revolution count $-\Delta n_1S$ are respectively above and below the maximum permitted change in revolution count $\pm\Delta n_{max}$. That is to say, both wheels are spinning. In the same way the gradients $\beta S_1$, $\beta S_2$ are steeper than the maximum permitted gradient, from which it can also be concluded that slipping is present.

In a relatively short second time period $t_2S$ it is detected that there is a reduction in revolution count $-\Delta n_2S'$ of the wheel 2 on the outside of the curve and an increase in revolution count $+\Delta n_1S'$ of the wheel 1 on the inside of the curve, as measured from the starting value for revolution count, where the associated gradients are again greater than the maximum permitted gradient. Slipping is thus also present in this case.

With the revolution count changes $+\Delta n_2S'$, $-\Delta n_1S'$, which take place during a third $t_3S$ time period and a fourth $t_4S$ time period respectively, and which are less than the maximum permitted change in revolution count $\pm\Delta nmax$, the example illustrated in FIG. 6 has gradients that are larger than the maximum permitted gradient. Hence, slipping is also occurring in this case, despite the fact that the permitted maximum changes in revolution count $\pm\Delta nmax$ have not been exceeded.

A slip of the wheels 1, 2 can also be ascertained from the circumstance that the time in which a given revolution count has been achieved is shorter than the time that would be necessary to achieve the same revolution count with a usual steering operation. As FIG. 6 shows when compared with FIG. 5, the first time period $t_1S$, in which the change in revolution count $\Delta n_1'$ takes place, is shorter than a minimum permitted time period $tL_{min}$, which may not be undershot in order to allow the permitted maximum revolution count $\pm\Delta n_{max}$ to be reached ($t_1 S < tL_{min}$).

In such cases a positive slip indicator can be set in the control device 8. In this case, when ascertaining the steering angle $\alpha$, no change will be made to the previously detected steering angle $\alpha$.

According to the present invention, in the embodiment illustrated, a plausibility check of the detected velocities $v_1$, $v_2$ or measured values related thereto is always carried out for slip detection. More particularly, this plausibility check involves ascertaining the progression of the wheel velocities $v_1$, $v_2$ and/or the progression of the wheel velocity difference $\Delta v$ and/or the progression of measured values directly related to these values, and comparing these values with a threshold value as described above, in which case if one of the threshold values is overrun or underrun a positive slip indicator is set.

Such a progression threshold value can thus, for example, be the minimum permitted time period $tL_{min}$ in which all of the detected wheel velocity changes or revolution count changes $\Delta n$ take place. For example, in the embodiment as illustrated in FIG. 6, the minimum permitted time period $tL_{min}$ is set to be 1 second. When revolution count changes $\Delta n$ that take place entirely within the permitted minimum time period $tL_{min}$ are detected, slipping can be inferred and the slip indicator can be set as positive.

To guarantee that the steering angle is ascertained without error, a slip detection procedure is carried out, according to the invention, during the process of ascertaining the steering angle, and the value for the detected steering angle is only then corrected if no positive slip indicator has been set.

The invention claimed is:

1. A method for ascertaining a steering angle ($\alpha_3$) of at least one steerable wheel of a set of steerable wheels of a machine that can be directionally controlled, which machine comprises at least said set of steerable wheels and at least one set of drivable wheels having a specific wheelbase ($a_1$) relative to said steerable wheels and spaced from one another by a track width ($b_1$), comprising:
    detecting a wheel velocity of the at least two drivable wheels;
    ascertaining a wheel velocity difference ($\Delta v$) between velocities ($v_1$; $v_2$) of said two drivable wheels;
    ascertaining a yaw rate ($\psi$) using the relationship $$\psi = \frac{v_2 - v_1}{b_1}$$

ascertaining a real circle radius ($r_1$) of the drivable wheel on an inside of a curve using the relationship $$r_1 = \frac{v_1}{\psi}$$

ascertaining the steering angle $\alpha_3$ using the relationship $$\alpha_3 = \arctan\left(\frac{a_1}{r_1}\right),$$

in which:
    $v_1$ denotes the velocity of the drivable wheel on the inside of the curve,
    $v_2$ denotes the velocity of the drivable wheel on an outside of the curve,
    $\psi$ denotes the yaw rate,
    $\alpha_3$ denotes the steering angle of the steerable wheel on the inside of the curve,
    $r_1$ denotes the circle radius of the drivable wheel on the inside of the curve,
    $r_2$ denotes a circle radius of the drivable wheel on the outside of the curve,
    $a_1$ denotes the wheelbase, and
    $b_1$ denotes the track width.

2. The method according to claim 1, wherein slip detection is carried out in order to exclude erroneous ascertainment of the steering angle ($\alpha_3$) due to the presence of slip on at least one of the drivable wheels.

3. The method according to claim 2, wherein said slip detection involves a plausibility check of the detected wheel velocity ($v_1$; $v_2$) of at least one of the drivable wheels.

4. The method according to claim 3, wherein said plausibility check involves ascertaining the progression of the wheel velocities $v_1$, $v_2$ of at least one wheel and/or the progression of the wheel velocity difference ($\Delta v$) of the two wheels and/or the progression of measured values directly related to these values, and comparing these values with a progression threshold value, in which case if one of the threshold values is overrun or underrun a positive slip indicator is set.

5. The method according to claim 4, wherein in the case of a set positive slip indicator, the previously ascertained or set value of the steering angle ($\alpha$) is retained.

6. The method according to claim 3, wherein the progression threshold value is the maximum permitted change in wheel velocity ($v_1$; $v_2$) and/or change in the wheel velocity difference ($\Delta v$) during a plausibility time period, and is a maximum permitted change ranging from 10% to 30%.

7. The method according to claim 3, wherein the progression threshold value is a change in wheel velocity of one wheel of approximately 0% while a detected change in wheel velocity of the other wheel is greater than 0%.

8. A method for ascertaining a steering angle ($\alpha_3$) of at least one steerable wheel of a set of steerable wheels of a machine that can be directionally controlled, which machine comprises at least said set of steerable wheels and at least one set of drivable wheels having a specific wheelbase ($a_1$) relative to said steerable wheels and spaced from one another by a track width ($b_1$), comprising:
    detecting a wheel velocity ($v_1$; $v_2$), or a measured value directly related thereto, such as the revolution count ($n_1$; $n_2$), of the at least two drivable wheels;
    ascertaining a real circle radius ($r_1$) of the driven wheel (1) on an inside of a curve using the relationship $$r_1 = r_0 - \frac{b_1}{2},$$

$$\text{where } r_0 = -\frac{b_1}{2} \cdot \frac{\left(\frac{v_2}{v_1} + 1\right)}{\left(1 - \frac{v_2}{v_1}\right)};$$

ascertaining a steering angle $\alpha_3$ using the relationship $$\alpha_3 = \arctan\left(\frac{a_1}{r_1}\right),$$

where:
    $v_1$ denotes the velocity of the driven wheel on the inside of the curve,
    $v_2$ denotes the velocity of the driven wheel on an outside of the curve,
    $\psi$ denotes a yaw rate,
    $\alpha_3$ denotes the steering angle of the steerable wheel on the inside of the curve,
    $r_1$ denotes the circle radius of the driven wheel on the inside of the curve,
    $r_2$ denotes a circle radius of the driven wheel on the outside of the curve,
    $a_1$ denotes the wheelbase, and
    $b_1$ denotes the track width.

9. The method according to claim 8, wherein slip detection is carried out in order to exclude erroneous ascertainment of the steering angle ($\alpha_3$) due to the presence of slip on at least one of the drivable wheels.

10. The method according to claim 9, wherein said slip detection involves a plausibility check of the detected wheel velocity ($v_1$; $v_2$) of at least one of the drivable wheels.

11. The method according to claim 10, wherein said plausibility check involves ascertaining the progression of the wheel velocities $v_1$, $v_2$ of at least one wheel and/or the progression of the wheel velocity difference ($\Delta v$) of the two wheels and/or the progression of measured values directly related to these values, and comparing these values with a progression threshold value, in which case if one of the threshold values is overrun or underrun a positive slip indicator is set.

12. The method according to claim 11, wherein in the case of a set positive slip indicator, the previously ascertained or set value of the steering angle ($\alpha$) is retained.

13. The method according to claim 10, wherein the progression threshold value is the maximum permitted change in wheel velocity ($v_1$; $v_2$) and/or change in the wheel velocity difference ($\Delta v$) during a plausibility time period, and is a maximum permitted change ranging from 10% to 30%.

14. The method according to claim 10, wherein the progression threshold value is a change in wheel velocity of one wheel of approximately 0% while a detected change in wheel velocity of the other wheel is greater than 0%.

15. A device for ascertaining a steering angle ($\alpha_3$) of at least one steerable wheel of a set of steerable wheels of a machine that can be directionally controlled, which machine comprises at least said set of steerable wheels and at least one set of drivable wheels having a specific wheelbase ($a_1$) relative to said steerable wheels and spaced from one another by a track width ($b_1$), said device comprising:
  a plurality of wheel velocity sensors for detecting respective wheel velocities ($v_1$, $v_2$) of said drivable wheels, and
  a control device adapted to receive the detected wheel velocities ($v_1$, $v_2$) of said driven wheels, from which the control device ascertains the steering angle ($\alpha_3$) of at least one steerable wheel using at least one of the following relationships:

$$\alpha_3 = \arctan\left(\frac{a_1}{r_1}\right),$$

where $\psi = \frac{v_2 - v_1}{b_1}$, $$r_1 = \frac{v_1}{\psi}; \text{ or}$$

$$r_1 = r_0 - \frac{b_1}{2},$$

where $r_0 = -\frac{b_1}{2} \cdot \frac{\left(\frac{v_2}{v_1} + 1\right)}{\left(1 - \frac{v_2}{v_1}\right)}$ or $$r_0 = -\frac{b_1}{2} \cdot \frac{\left(\frac{n_2}{n_1} + 1\right)}{\left(1 - \frac{n_2}{n_1}\right)};$$

respectively, where
$v_1$ denotes the velocity of the drivable wheel on the inside of a curve;
$v_2$ denotes the velocity of the drivable wheel on an outside of the curve;
$\psi$ denotes a yaw rate;
$\alpha_3$ denotes the steering angle of the steerable wheel on the inside of the curve
$r_1$ denotes a circle radius of the drivable wheel on the inside of the curve;
$r_2$ denotes a circle radius of the drivable wheel on the outside of the curve;
$r_0$ denotes a circle radius of the midpoint of the track width between the drivable wheels on the inside and outside of the curve;
$a_1$ denotes the wheelbase; and
$b_1$ denotes the track width.

16. The device according to claim 15, wherein said control device comprises a slip detecting device which is configured such that a plausibility check of the detected wheel velocities ($v_1$; $v_2$) of said driven wheels can be carried out in order to avoid erroneous ascertainment of said steering angle ($\alpha_3$) due to slipping of at least one of the driven wheels.

* * * * *